United States Patent [19]

Nottingham et al.

[11] Patent Number: 5,088,180
[45] Date of Patent: Feb. 18, 1992

[54] METHOD FOR ASSEMBLING A MULTI-PART ARTICLE OF FURNITURE

[75] Inventors: John R. Nottingham; John W. Spirk, both of Moreland Hills; Jeffrey M. Kalman, Cleveland Heights; Robert G. Taylor, Strongsville; Roland A. Stenta, Shaker Heights; Emily P. Stenta, Cincinnati, all of Ohio

[73] Assignee: Galsten Trading, Inc., Cleveland, Ohio

[21] Appl. No.: 531,878

[22] Filed: May 31, 1990

[51] Int. Cl.⁵ .......................................... B23P 19/02
[52] U.S. Cl. ...................................... 29/525; 29/469; 52/585; 297/440
[58] Field of Search ........... 29/897.3, 897.31, 897.312, 29/525, 525.1, 469; 52/585, 582; 297/440, 443

[56] References Cited

U.S. PATENT DOCUMENTS

| | | | |
|---|---|---|---|
| 2,705,995 | 4/1955 | McMurtry | 29/469 |
| 3,996,718 | 12/1976 | Welsh | 52/582 X |
| 4,201,417 | 5/1980 | Griffith | 297/440 X |
| 4,209,198 | 6/1980 | Apple, Sr. | 297/440 X |
| 4,254,596 | 3/1981 | Wright et al. | 52/36 X |
| 4,332,205 | 6/1982 | Corl, Jr. | 52/36 X |
| 4,470,716 | 9/1984 | Welch | 52/584 X |
| 4,474,493 | 10/1984 | Welch | 52/585 X |
| 4,577,906 | 3/1986 | Hsiung | 297/440 |
| 4,691,965 | 9/1987 | Hsiung | 297/440 |

*Primary Examiner*—Timothy V. Eley
*Assistant Examiner*—C. Richard Martin
*Attorney, Agent, or Firm*—Connolly and Hutz

[57] ABSTRACT

A multi-part article of furniture, such as a chair or table, capable of being assembled without tools or glue is disclosed. The legs of the table or chair can be rigidly, but removably, attached to the table top or chair seat by slideably engaging an elongated dowel protruding from an upper side surface of the leg into a mating slot formed in the end wall of an apron attached to the underside of the table top or chair seat. Alternatively, the elongated dowel may protrude from the apron and the upper side surface of the leg may contain a mating slot. Fastening clips may provide additional attachment between the legs and aprons and a separate dowel protruding from the upper end surface of the leg may mate with a bore in the underside of the seat or table top. In one embodiment, the length of the legs is varied either by replacement with longer-length legs or by the addition of leg-extension members.

4 Claims, 5 Drawing Sheets

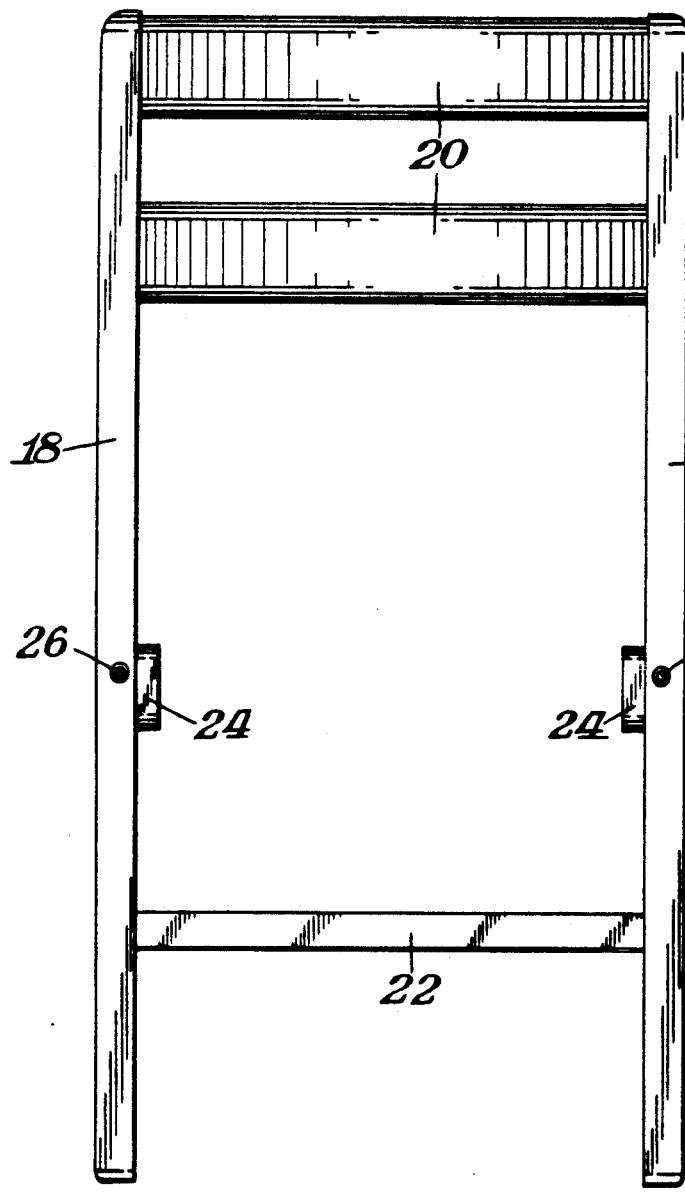
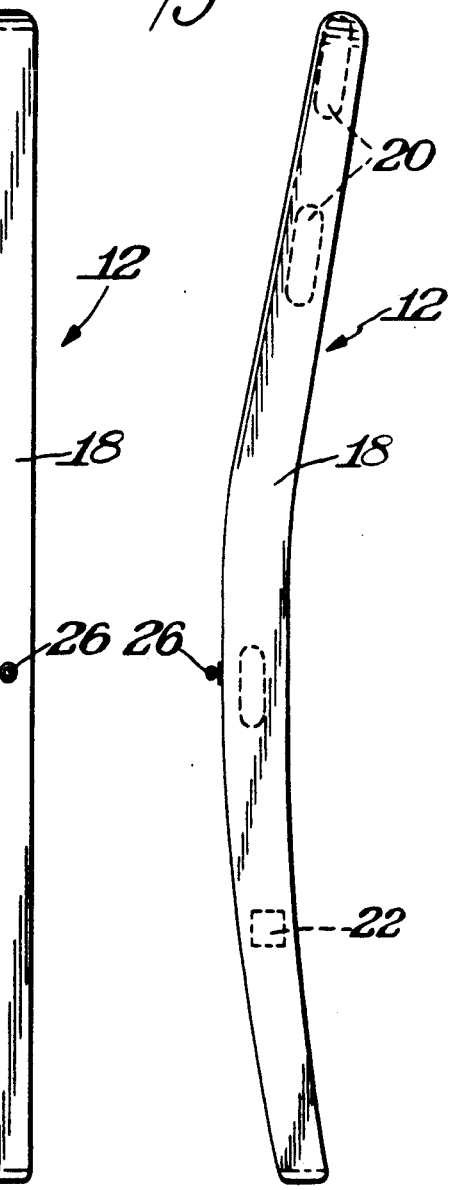

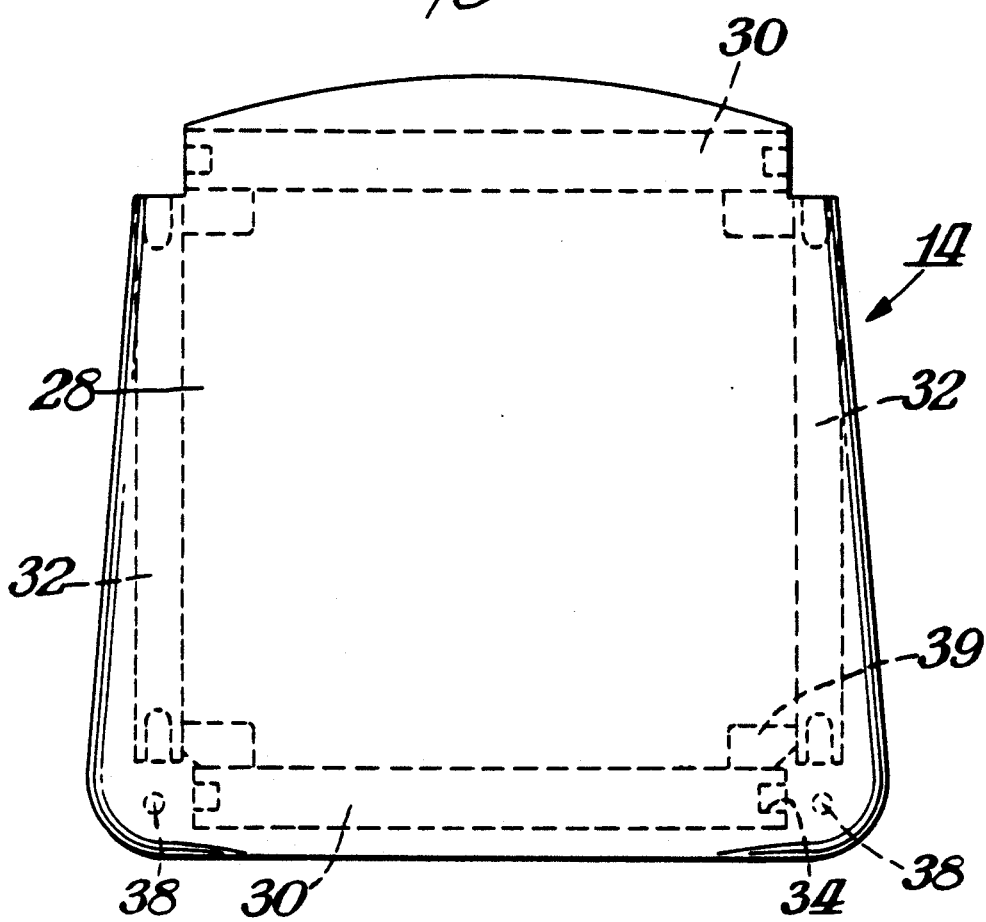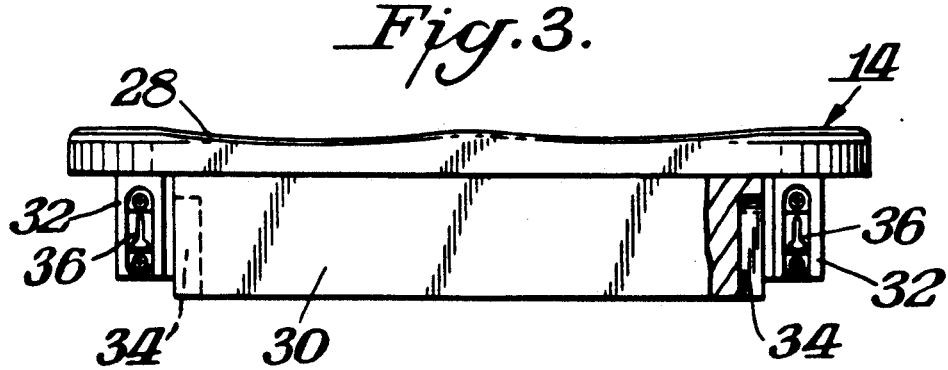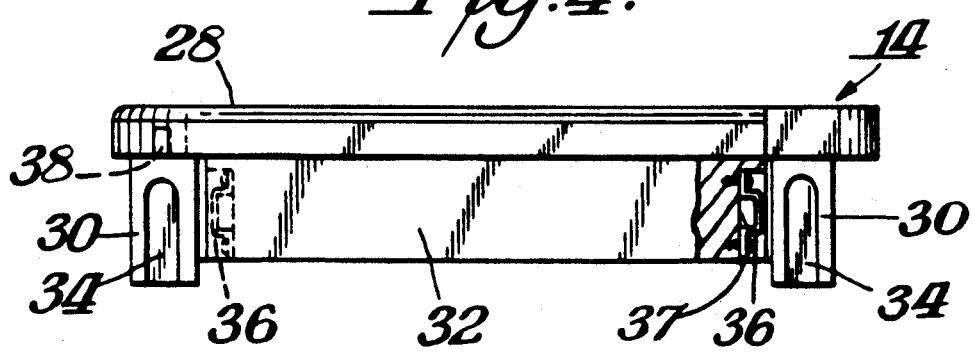

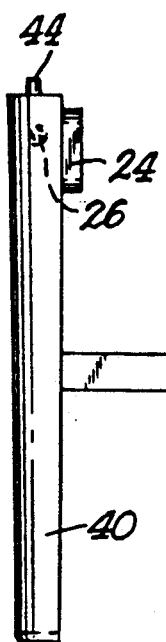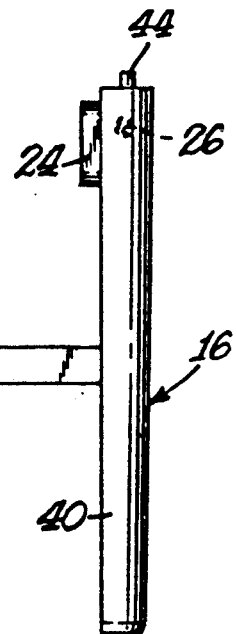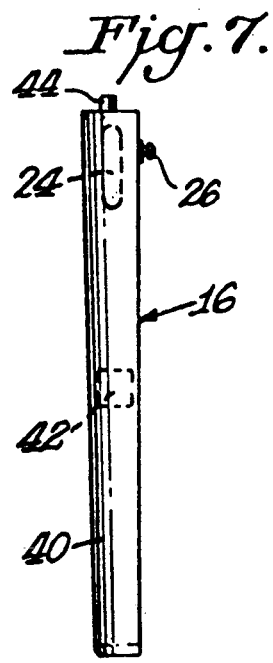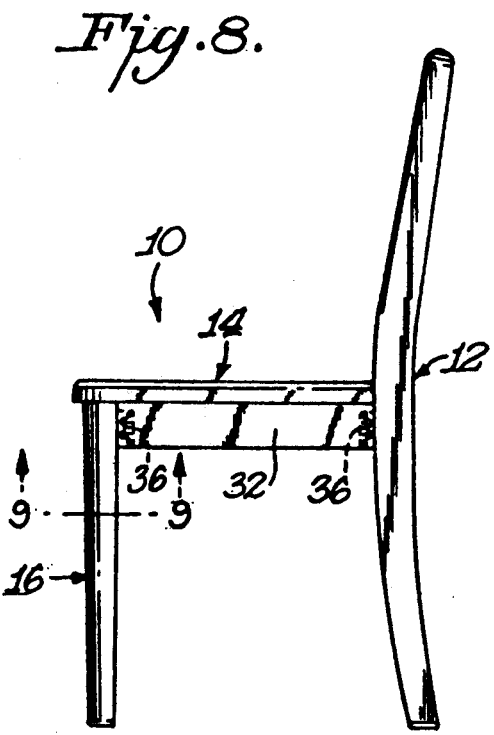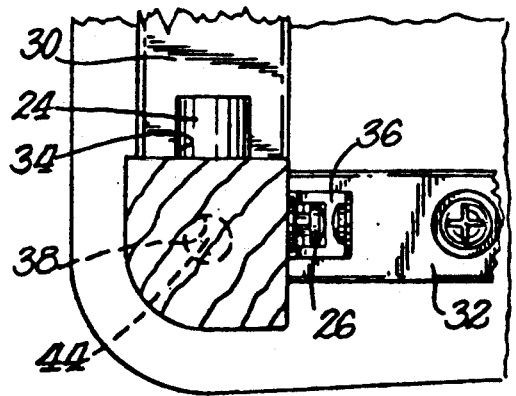

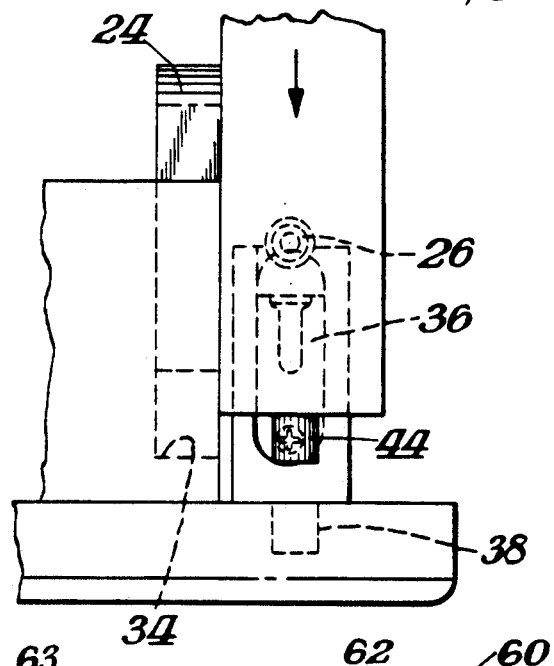
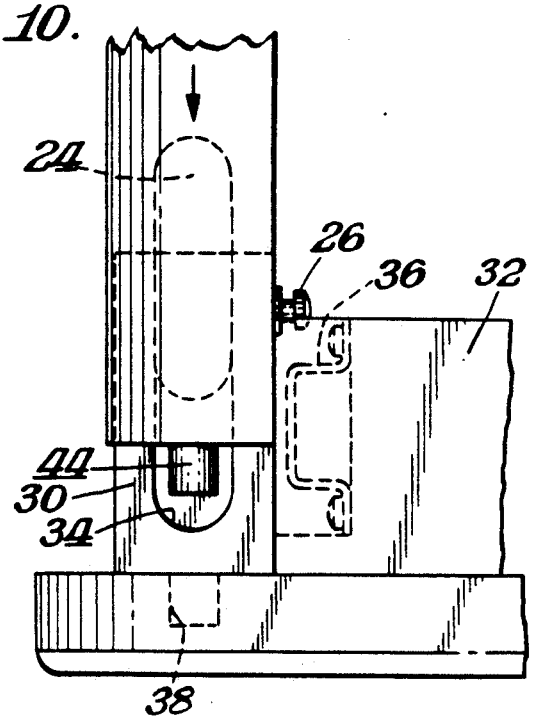
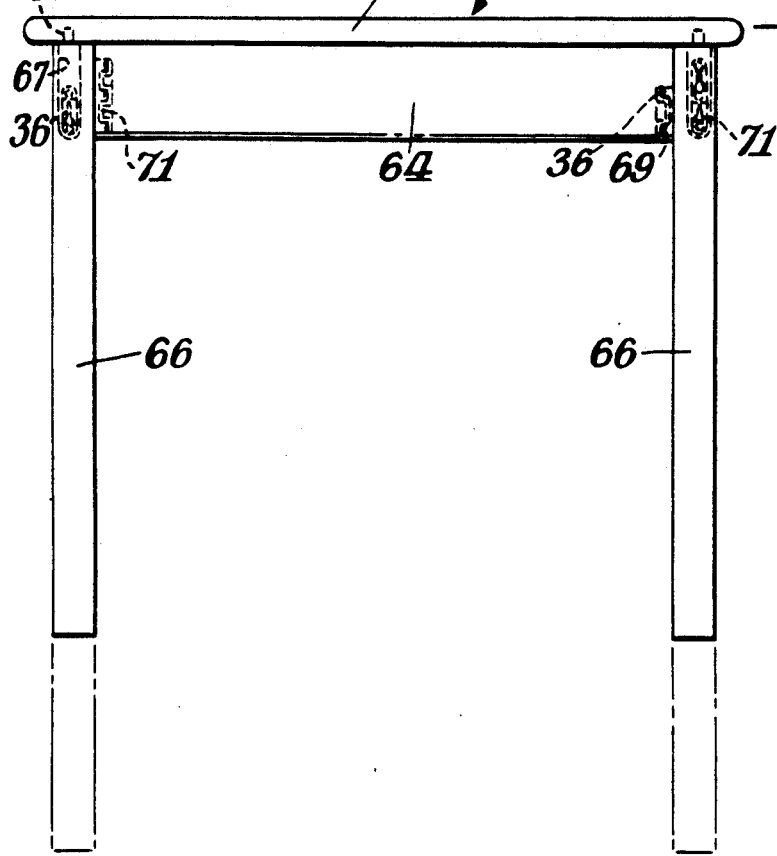
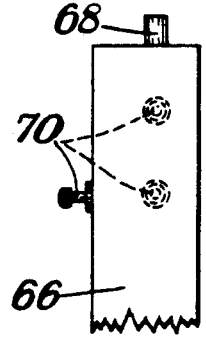

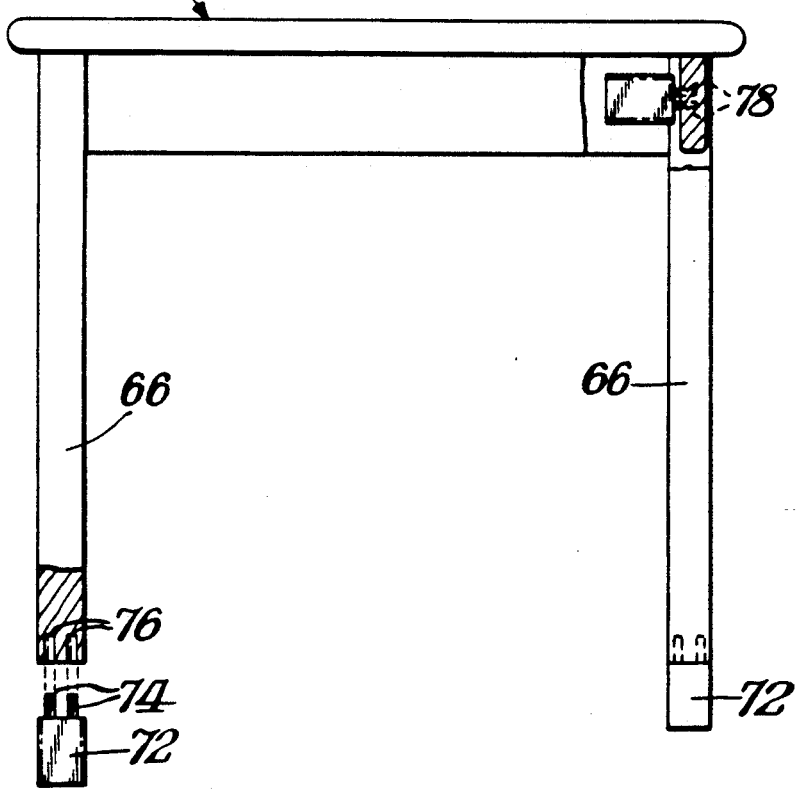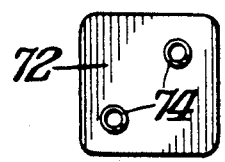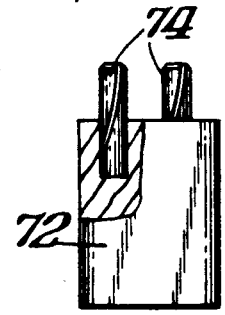

METHOD FOR ASSEMBLING A MULTI-PART ARTICLE OF FURNITURE

BACKGROUND OF THE INVENTION

This invention relates to ready-to-assemble furniture capable of being assembled by the consumer without the need for tools, screws, nails or glue. The elements can be packaged and shipped disassembled. When assembled, the elements are rigidly, but removably, attached and have connection joints of enhanced structural strength and stability.

Furniture capable of assembly by the consumer, e.g., ready-to-assemble, is well known; however, such furniture assembly typically involves lengthy detailed assembly steps, which include the use of glue or other adhesives or the use of hand tools, screws, brackets or nails to fasten the elements together. The disassembly and reassembly of this furniture is often not practicable.

Certain ready-to-assemble furniture without such adhesives or the need for tools is also known. Such furniture, often called knock-down furniture, employs various surface-mounted or recess-mounted fastener clips and mating shoulder screws, such as the furniture described in U.S. Pat. Nos. 3,996,718, 4,178,047, 4,332,205, 4,470,716, 4,473,316, 4,474,493, assigned to Modular Systems, Inc. of Fruitport, Mich. The use of such clips as the only fastening means results in joints of less-than-desirable structural stability and also requires lengthy mating surfaces of the furniture parts being joined in order to give stability and strength to the overall furniture assembly.

Therefore, it is an object of this invention to provide ready-to-assemble furniture without these disadvantages.

SUMMARY OF THE INVENTION

Accordingly, the present invention provides a multi-part article of furniture capable of assembly without tools, screws, nails or glue. The supporting members, such as the legs of a table or chair, are rigidly, but removably, attached to the member being supported, such as a table top or chair seat, by slideably engaging an elongated dowel protruding from a side surface of the upper end of the supporting member into a mating slot formed in the end wall of an apron attached to the underside of the supported member. Alternatively, the elongated dowel may protrude from the apron and engage a mating slot in the side of the leg. This connection between elongated dowel and mating slot provides improved structural strength over other fastening means.

In a preferred embodiment of the invention, the legs of a table or chair are provided with a standard wooden dowel axially aligned with the leg and extending from the upper end of the leg, an elongated dowel protruding from an upper side surface of the leg and a fastener such as a shoulder screw protruding from another upper side surface of the leg, substantially perpendicular to the elongated dowel. The underside of the table or chair seat is provided with aprons, which have been previously affixed lengthwise with the ends of the aprons spaced a predetermined distance from each other corresponding to the width of the legs at the upper end. On the ends of the aprons are provided either mating slots or recesses into which recesses semi-locking fastener clips have been inserted. To assemble the table or chair, the elongated dowel and fastener protruding from the upper side surfaces of the legs are slideably engaged into the mating slot and fastener clip of the aprons, respectively. When the leg is fully engaged, the upper dowel protruding from the upper end of the leg is inserted into a bore in the underside of the table or chair seat and the upper end surface of the leg is in contact with the underside of the table or chair seat. The legs are thus connected to the table or chair seat at three points. Such connection is stable and structurally sound; yet, the legs can be easily disassembled for storage or replacement.

In an alternative embodiment the elongated dowel and corresponding mating slot can be replaced by a double fastener clip and fastening means.

In another preferred embodiment the height of the furniture can be adjusted by replacing the entire set of legs with longer legs or by attaching leg extension members to the bottom of the legs. Such attachment requires no tools, screws, nails, brackets or glue.

The simplicity of assembly and disassembly is an advantage not found with other ready-to-assemble furniture fastened together with tools or glue. The furniture may be repeatedly disassembled and reassembled without any loss of structural integrity. The strength and stability of the connections between the legs and table or chair seat is improved over other knockdown furniture.

These and other objects, advantages, purposes and features of the invention will become more apparent from a study of the following description in conjunction with the drawings.

BRIEF DESCRIPTION OF THE DRAWINGS

FIG. 1 is a front elevational view of a chair back and back-leg member.

FIG. 2 is a side elevational view of a chair back and back-leg member.

FIG. 3 is a front elevational view of the chair seat with an affixed front apron, which is partially cut away at one end to show detail of mating slot.

FIG. 4 is a side elevational view of the chair seat with an affixed side apron, which is partially cut away at one end to show detail of fastener clip.

FIG. 5 is a top plan view of the chair seat.

FIG. 6 is a front elevational view of the front-leg assembly.

FIG. 7 is a side elevational view of the front-leg assembly.

FIG. 8 is a side elevational view of the entire chair assembly.

FIG. 9 is a fragmentary sectional view taken along the line 9—9 of FIG. 8 to show the connections between the chair seat aprons and one front leg.

FIG. 10 is a partial side-elevational view of the assembly of a supporting leg to the chair seat or table top.

FIG. 11 is a partial front-elevational view of the assembly of a supporting leg to the chair seat or table top.

FIG. 12 is a front elevational view of the table assembly, illustrating alternative connection between supporting legs and table top.

FIG. 13 is a partial front elevational view of a table leg, with fasteners for alternative connection.

FIG. 14 is a front elevational view of a table assembly, partially cut away to show detail for alternate leg-extending embodiment.

FIG. 15 is a side elevational view of a leg-extension member, partially cut away to show detail of compression dowel.

FIG. 16 is a top plan view of a leg-extension member.

DETAILED DESCRIPTION OF THE PREFERRED EMBODIMENTS

Referring now to the drawings in greater detail, FIGS. 1 through 10 illustrate a first embodiment of the ready-to-assemble furniture of the present invention. This first embodiment is a chair assembly 10 (FIG. 8). The chair is composed of a chair back and back-leg member 12, a chair seat and apron member 14, and a front leg member 16, slideably engageable with one another to form a chair. The chair assembly 10 is illustrated in FIG. 8.

As shown in FIGS. 1 and 2, the chair back and leg member 12 is composed of two rails 18, which are connected by a rung 22 and one or more slats 20. Projecting from the rails 18 in a direction substantially parallel to the slats 20 and rung 22 are two elongated dowels 24. The elongated dowels 24 are preferably located substantially at the midpoint of the rails 18. Also projecting from the rails 18 are two fasteners 26, such as shoulder screws, studs or other projecting fasteners of the type described in U.S. Pat. Nos. 3,741,594, 3,894,377, 3,996,718, 4,332,205, 4,470,716 and 4,473,316. The shoulder screws 26 project from the front surface of the rails 18, substantially perpendicular to the elongated dowels 24. The shoulder screws 26 are located substantially at the same height on the rails 18 as the elongated dowels 24.

FIGS. 3 through 5 show the elements of the chair seat and apron member 14 of the chair assembly 10. FIG. 5 is a top plan view of the chair seat 28. Attached to the underside of the chair seat 28 are two sets of aprons 30, 32. FIG. 3 is a front elevation of the chair seat 28 with the apron 30 attached (in the factory) to the underside of the chair seat 28 by any suitable fastening means, such as screws or brackets, generally known to the art. The apron 30 has a mating slot 34 cut into each end wall of the apron 30. Preferably, there are two such aprons 30 of the type shown in FIG. 3 attached to the underside of the chair seat 28; with one such apron 30 attached at substantially the front underside edge of the chair seat, and the other such apron 30 attached to the rear underside edge of the chair seat.

FIG. 4 shows a side elevation of the chair seat 28 with apron 32, partially cut away to show in greater detail the fastener in the end walls of the apron 32. In FIG. 4 a factory-installed apron 32 is attached to the underside of the chair seat 28 by any suitable fastening means, such as with screws or brackets. The apron 32 has fasteners 36 secured in a recess 37 in each end wall of the apron 32. The fasteners 36 are preferably semi-locking fastener clips such as those disclosed in U.S. Pat. Nos. 4,473,316, 3,996,718 and 3,894,377. Preferably there are two such aprons 32 of the type shown in FIG. 4 attached to the underside of the chair seat 28, with one such apron 32 at one underside edge of the chair seat and the other such apron 32 at another underside edge of the chair seat.

The aprons 30, 32 protrude from the underside of the chair seat in a substantially perpendicular direction and are additionally substantially perpendicular to one another. Spacer blocks 39 may be attached to the underside of the chair seat 28 in order to square the alignment of the aprons 30, 32. Such spacer blocks 39 are generally known to be suitable for this purpose. When the aprons 30, 32 are so aligned as shown in hidden detail in FIG. 5, the spaces formed between the end walls of the aprons 30, 32 are a predetermined width dimension for the upper end of the front legs 40 and for the substantial midpoint of the rails 18. The underside of the chair seat also may contain two or more bores 38, located near the front corners of the chair seat 28.

FIGS. 6 and 7 illustrate the front leg assembly 16 of the chair assembly 10. In the factory the two front legs 40 are connected by a rung 42. At the upper end of the legs 40 there are dowels 44 protruding from the upper leg surface in the axial direction of the legs 40. Protruding from the upper side surface of the legs 40, substantially perpendicular thereto and in a direction parallel to the rung 42 are two elongated dowels 24. These elongated dowels 24 are similar to the elongated dowels 24 of the chair back and leg assembly 12 shown in FIG. 1. Fasteners 26 such as shoulder screws, protrude from an upper side surface of the leg 40 in a direction perpendicular to the elongated dowel 24.

The chair 10 may be assembled by the purchaser in only two simple steps. First, as shown in detail in FIGS. 10 and 11, the front leg assembly 16 is rigidly but removably attached to the chair seat assembly by slideably engaging the shoulder screws 26 of the front legs 40 into the fastener clips 36 of the two aprons 32. At the same time, the elongated dowels 24 of the front leg assembly 16 are slideably engaged into the mating slots 34 of the apron 30 affixed to the front underside of the chair seat 14. The screws 26 and elongated dowels 24 of the front legs 40 are thus inserted into the fastener clips 36 and mating slots 34, respectively, and the legs 40 are forced toward the chair seat 28 until the dowel 44 nests in the bore 38 in the underside of the chair seat 28.

Second, in a similar manner the chair back and back-leg assembly 12 is rigidly but removably attached to the chair seat assembly 14. The shoulder screws 26 protruding from the chair rails 18 may be slideably engaged into the fastener clips 36 of the aprons 32. At the same time, the elongated dowels 24 protruding from the chair rails 18 may be slideably engaged into the mating slots 34 of the apron 30 affixed to the rear underside of the chair seat 28. The elongated dowels 24 and shoulder screws 26 thus inserted are forced toward the chair seat 28 until fully engaged in the mating slots 34 and fastener clips 36.

FIG. 9 discloses in detail the connection between the front leg assembly 16 and the aprons 30, 32 of the chair seat assembly 14. In the assembled form the shoulder screw 26 is engaged firmly in the fastener clip 36. The dowel 44 is engaged firmly in the bore 38. The elongated dowel 24 is engaged in the mating slot 34. There are thus three connections between the front leg assembly 16 and the chair seat assembly 14. As so connected, the legs 40 are rigidly but removably attached to the chair seat and apron assembly 14. As attached, the chair is more structurally stable than other knock-down furniture presently known.

As should be readily apparent to those skilled in the art, the connecting members may be incorporated into the chair seat and apron assembly 14 and front and back leg assemblies 16, 12 in an alternate fashion such that the elongated dowels 24 and fastening means 26 may protrude from the aprons 30, 32 and the rails or legs 18, 40 may contain mating slots 34 and recesses 37 into which fastening clips 36 have been installed.

Neither tools, nor glue, nor adhesive are required for the purchaser to affix the three elements 12, 14, 16 of the chair assembly 10 to each other. No additional parts, such as screws or brackets or other fastening means, are required.

The ready-to-assemble chair invention disclosed herein can be disassembled in a simple manner as well without the need for any tools. Disassembly entails removing the front leg assembly 16 from the chair seat and apron assembly 14 by applying a force in the opposite direction of the assembly process. One may disengage the shoulder screws 26 from the fastener clips 36 and at the same time disengage the elongated dowels 24 may be disengaged from the mating slots 34. Once disengaged, the separate assemblies are readily stored or moved, a most desirable feature. Such disassembly and reassembly can be done repeatedly without any loss of structural integrity.

This invention is also particularly suited to other ready-to-assemble furniture such as tables, stools or shelving. The connection between any supporting leg and a surface to be supported, such as a table top, can be identical to the connection between the front leg 40 and chair seat and apron assembly 14 of the chair, detailed in FIGS. 1 through 11.

In another embodiment of the invention the elongated dowels 24 and mating slots 34 can be replaced by other fastening means. For example, there is shown in FIGS. 12 and 13 a table assembly 60 comprising a table top 62 with four aprons 64 affixed to the underside of the table top 62. The aprons 64 have in a recess at one end a single semi-locking fastener clip 69 and in a recess and at the other end a semi-locking double fastener clip 71. Such semi-locking double fastening clips 71 are available from Modular Systems, Inc. of Fruitport, Mich. 49415. In the factory, the aprons 64 are attached lengthwise and substantially perpendicular to the underside of the table top 62, preferably along the outer edges of the table top 62, using any suitable fastener generally known, such as screws or brackets. The ends of the aprons 64 so attached are spaced from one another a predetermined distance corresponding to the width dimension of the upper end of the leg 66. The aprons 64 are attached so that the end of an apron 64 with a single fastening clip 69 is proximate to an end of another apron with a double fastening clip 71. Four legs 66 are provided, having a dowel 68 protruding in an axial direction from the upper end surface and having a single fastener means, such as a shoulder screw 70, protruding substantially perpendicularly from an upper side surface of the legs 66. A pair of fastening means, such as shoulder screws 70, also protrude substantially perpendicularly from an upper side surface of the leg 66 and in a direction perpendicular also to the single shoulder screw 70, earlier mentioned.

The table 60 is assembled with only a few simple steps. The legs 66 are rigidly but removably inserted into the table top and apron assembly 62, 64. First, the single protruding shoulder screw 70 is slideably engaged into the single fastening clip 69 in the end wall of one apron 64. At the same time, the pair of shoulder screws 70 protruding from the table legs 66 are slideably engaged into the double fastener clip 71 of another proximate apron 64. By pushing the upper end surface of the leg 66 toward the underside of the table top 62, the three shoulder screws 70 will fully engage into the openings in the fastener clips 69, 71, and the dowel 68 protruding from the upper surface of the leg 66 in the axial direction will engage the bore 63 in the underside of the table top 62. There are thus at least three connections between the leg 66 and the table top and apron assembly 62, 64. Yet, assembly by the purchaser requires neither tools nor glue, nor additional fasteners, such as screws or brackets.

To disassemble the table 60, the legs 66 must be removed in the opposite manner from which they were inserted, thereby pulling the dowel 68 out of the bore 63 in the table top 62 and disengaging the shoulder screws 70 from the fastener clips 69, 71. As assembled, the table is most rigid and sturdy, but disassembly can be most readily accomplished. Reassembly is conducted in the same manner as assembly. Reassembly and disassembly can be done repeatedly.

It is often desired that furniture for children or juveniles be readily adaptable to use by adults; that is, when the children grow, it would be desirable to have furniture that will grow with them. This invention will accomplish such objective. For example, with the table disclosed in FIGS. 12 and 13, the legs 66 can be sold in varying lengths. Thus, when a longer-length table leg is desired, the shorter legs are simply removed as described above and the longer legs can be inserted into the table top and apron assembly 62, 64.

In another embodiment of the invention, as shown in FIGS. 14 through 16, the legs 66 can be extended by the addition of leg extension members 72 attached to the bottom of the legs. Thus, the bottom ends of the table legs 66 are provided with one or more axial directed bores 76. One or more compression dowels 74 extending perpendicularly from the upper surface of leg extension members 72 are inserted into the bores 76 of the table leg 66. The compression dowels 74 are force-fit into the bores 76, providing rigid but removable attachment without the need for tools or glue. Suitable compression dowels for this purpose are disclosed in U.S. Pat. No. 4,474,493, although other known, equally suitable fasteners may be employed. The length of the table leg 66 can be extended, using one or more of these extension members 72.

It may be desired to sell the table leg extension members 72 in conjunction with the original table assembly 60 in the same package. If so, such table leg extension members 72 can be stored until needed by inserting the compression dowels 74 of the leg extension members into bores 78 drilled into the inner side surface of the aprons 64 of the table assembly 60. Such method of storage is shown in FIG. 14 in partial cut-away view. Other storage methods can be employed. For example, the leg extension members 72 can be separately packaged and the package enclosed with or attached to the table assembly 60.

While several forms of the invention have been shown and described, other forms will now be apparent to those skilled in the art. Therefore, it will be understood that the embodiments shown in the drawings and described above are merely for illustrative purposes, and are not intended to limit the scope of the invention, which is defined by the claims which follow.

We claim:

1. A method for assembling a multi-part article of furniture, comprising the steps of:
    (1) positioning a support member with an upper and a lower end in a partially assembled position such that an elongated dowel protruding from an upper side surface of the support member is aligned with and slideably engageable in a mating slot in an end wall of an apron affixed to a lower planar surface of a top member to be supported; and (2) moving said support member to a fully assembled position by slideably engaging the elongated dowel into the mating slot so that the upper end surface of the support member is in contact with the lower planar surface of the top member.

2. The method of claim 1 including positioning said support member in a partially assembled position such that additional fastening means between the support member and the end wall of the apron are aligned and engageable and slideably engaging the additional fastening means so that the support member is rigidly but removably locked into position also by such additional fastening means.

3. A method for assembling multiple furniture parts, comprising the steps of:
(a) positioning a first furniture part having an elongated dowel extending from a lateral surface thereof adjacent to but vertically offset from a second furniture part having a mating elongated U-shaped slot in an adjacent lateral surface thereof;
(b) positioning a first slideable fastening means on the first furniture part adjacent a mating second slideable fastening means, on the second furniture part; and
(c) slideably moving the first furniture part relative to the second furniture part so that the elongated dowel slides into the open end of the mating elongated U-shaped slot until fully engaged within the slot and the slideable fastening means jointly engage to securely, but removably, join the furniture parts.

4. The method of assembling multiple furniture parts recited in claim 3 wherein at least one additional dowel on one of the furniture parts is slideably moved into engagement with a mating bore on the other furniture part.

* * * * *